United States Patent [19]

Kyrtsos

[11] Patent Number: 5,490,073
[45] Date of Patent: Feb. 6, 1996

[54] DIFFERENTIAL SYSTEM AND METHOD FOR A SATELLITE BASED NAVIGATION

[75] Inventor: Christos T. Kyrtsos, Peoria, Ill.

[73] Assignee: Caterpillar Inc., Peoria, Ill.

[21] Appl. No.: 42,627

[22] Filed: Apr. 5, 1993

[51] Int. Cl.[6] ........................................................... G01S 5/02
[52] U.S. Cl. ........................... 364/449; 342/357; 342/457
[58] Field of Search ...................................... 364/443, 444, 364/449, 459; 73/178 R; 342/357, 358, 450, 451, 457; 340/988

[56] References Cited

U.S. PATENT DOCUMENTS

| | | | |
|---|---|---|---|
| 4,751,512 | 6/1988 | Longaker | 342/457 |
| 4,809,005 | 2/1989 | Counselman, III | 342/357 |
| 4,912,475 | 3/1990 | Counselman, III | 364/459 |
| 4,918,609 | 4/1990 | Yamawaki | 364/449 |
| 5,099,245 | 3/1992 | Sagey | 342/357 |
| 5,119,102 | 6/1992 | Barnard | 342/457 |
| 5,148,179 | 9/1992 | Allison | 342/357 |
| 5,155,490 | 10/1992 | Spradley, Jr. et al. | 342/358 |
| 5,225,842 | 7/1993 | Brown et al. | 342/357 |
| 5,323,322 | 6/1994 | Mueller et al. | 364/459 |
| 5,359,521 | 10/1994 | Kyrtsos et al. | 364/459 |
| 5,365,447 | 11/1994 | Dennis | 364/449 |

FOREIGN PATENT DOCUMENTS

| | | |
|---|---|---|
| 0574009A2 | 12/1993 | European Pat. Off. . |
| 2241623 | 9/1991 | United Kingdom . |

OTHER PUBLICATIONS

Enge et al., "Differential Operation Of The Global Positioning System", 2460 *I.E.E.E. Communications Magazine*, 26 (1988) Jul., No. 7, New York, N.Y. USA, pp. 48-59.

NASA's Jet Propulsion Laboratory, Pasadena, Calif., "Compensating For GPS Ephemeris Error," *NASA Tech. Briefs*, Nov., 1992, pp. 56 and 58.

Primary Examiner—Gary Chin
Attorney, Agent, or Firm—Sterne, Kessler, Goldstein & Fox

[57] ABSTRACT

A differential system and method for computing the position of a mobile receiver at or near the surface of the Earth using a base receiver having a known position and using a satellite-based navigation system including a constellation of navigation satellites is disclosed. The method includes the following steps. A base position estimate is computed for the base receiver using a pseudorange from a first satellite and ranges from two other satellites. A first vector difference between the base position estimate and the known position of the base receiver is computed. An initial position estimate is computed for the mobile receiver. A refined position estimate is computed for the mobile receiver using a pseudorange from the first satellite and ranges from two other satellites. A second vector difference between the initial position estimate and the refined position estimate of the mobile receiver is computed. Finally, a third vector difference between the first vector difference and the second vector difference is computed. The position of the first receiver is precisely computed by adding the third vector difference to the initial position estimate for the mobile receiver.

7 Claims, 12 Drawing Sheets

DIFFERENTIAL SYSTEM AND METHOD FOR A SATELLITE BASED NAVIGATION

FIELD OF THE INVENTION

This invention relates generally to the field of navigation systems which use a constellation of Earth-orbiting satellites to determine the position of a receiver at or near the Earth's surface. More specifically, the invention relates to a method and apparatus for improving the accuracy of position estimates in such a satellite based navigation system.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a pseudorange because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more detailed discussion on the NAVSTAR GPS, see Parkinson, Bradford W. and Gilbert, Stephen W., "NAVSTAR: Global Positioning System—Ten Years Later," *Proceedings of the IEEE*, Vol. 71, No. 10, October 1983; and *GPS: A Guide to the Next Utility*, published by Trimble Navigation Ltd., Sunnyvale, Calif., 1989, pp. 1–47, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference.

The NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The second mode of modulation in the NAVSTAR GPS is commonly referred to as the "precise" or "protected" (P) mode. The P-mode is also known as the "Precise Positioning Service".

The P-mode is intended for use only by Earth receivers specifically authorized by the United States government. Therefore, the P-mode sequences are held in secrecy and are not made publicly available. This forces most GPS users to rely solely on the data provided via the C/A mode of modulation (which results in a less accurate positioning system).

Moreover, the U.S. government (the operator of the NAVSTAR GPS) may at certain times introduce errors into the C/A mode GPS data being transmitted from the GPS satellites by changing clock and/or ephemeris parameters. That is, the U.S. government can selectively corrupt the GPS data. The ephemeris and/or the clock parameters for one or more satellites may be slightly or substantially modified. This is known as "selective availability" or simply SA. SA may be activated for a variety of reasons, such as national security.

When SA is activated, the U.S. government is still able to use the NAVSTAR GPS because the U.S. government has access to the P-mode modulation codes. The C/A mode data, however, may be rendered substantially less accurate.

In addition to the clock error, the atmospheric error and errors from selective availability, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system.

A differential GPS system (discussed herein below) will compensate or correct for many of these errors. In a differential system, GPS navigation signals received at a base station are used in conjunction with the known position of the base station to compute one or more biases. These biases, when communicated to the vehicle, can be used to improve the accuracy of GPS position estimates.

Known differential GPS systems will compensate or correct for many of the errors which reduce GPS positioning accuracy. However, the clock error and errors from SA are non-linear. Known differential techniques attempt to correct for these non-linear errors using a zero order approximation. This leads to less than ideal error correction.

Another problem with conventional differential GPS techniques is that the same four satellites must be available at both a base station and the vehicle. This, however, is not always possible. Shading (i.e., by mountains, walls of an open pit mine, trees, buildings, etc.) can prevent a base station and a vehicle from establishing direct line-of-sight communications with the same four satellites.

Yet another problem with conventional differential GPS techniques is that the lag time between computation of biases at a base station and use of the biases at a vehicle can introduce error into the position computations. The lag times may be in the order of several seconds.

What is needed is a differential GPS system/method which more precisely eliminates errors from the GPS position computations and which does not require that the same satellites be available at both a base station and the vehicle.

SUMMARY OF THE INVENTION

The invention is a differential system and method for improving the accuracy of vehicle position estimates. The invention computes a position offset at a base station (having a base receiver) resulting from pseudorange and ephemeris errors for a single satellite. Then, a position offset at the vehicle (having a mobile receiver) resulting from pseudorange and ephemeris errors for the same satellite is computed. By subtracting the offset occurring at the base station from the offset occurring at the vehicle, a precise vehicle position offset can be computed. The precise position of the vehicle is computed by adding this offset to an initial vehicle position estimate.

The method includes the following steps. A base position estimate is computed for the base receiver using a pseudorange from a first satellite and ranges from two other satellites. As used herein, a "range" is a computed distance between two given end points (e.g., between a satellite at x,y,z and a base station at $x_B, y_B, z_B$. A first vector difference between the base position estimate and the known position of the base receiver is computed.

An initial position estimate is computed for the mobile receiver using, for example, conventional open-ended or differential GPS techniques. A refined position estimate is computed for the mobile receiver using a pseudorange from the first satellite and ranges from two other satellites. A second vector difference between the initial position estimate and the refined position estimate of the mobile receiver is computed. Finally, a third vector difference between the first vector difference and the second vector difference is computed. The position of the first receiver is precisely computed by adding the third vector difference to the initial position estimate for the mobile receiver.

The apparatus of the invention includes:

(a) means, coupled to the base receiver, for computing a base position estimate using a pseudorange from a first satellite and ranges from two other satellites and for computing a first vector difference between the base position estimate and the known position of the base receiver;

(b) means for computing an initial position estimate for the mobile receiver;

(c) means, coupled to the mobile receiver, for computing a refined position estimate for the mobile receiver using a pseudorange from the first satellite and ranges from two other satellites and for computing a second vector difference between the initial position estimate and the refined position estimate of the mobile receiver; and (d) means for computing a third vector difference between the first vector difference and the second vector difference and for adding the third vector difference to the initial position estimate for the mobile receiver to produce a final position estimate for the mobile receiver.

DESCRIPTION OF THE PREFERRED EMBODIMENT

The present invention is now described with reference to the figures where like reference numbers denote like elements/steps.

Figure 1:
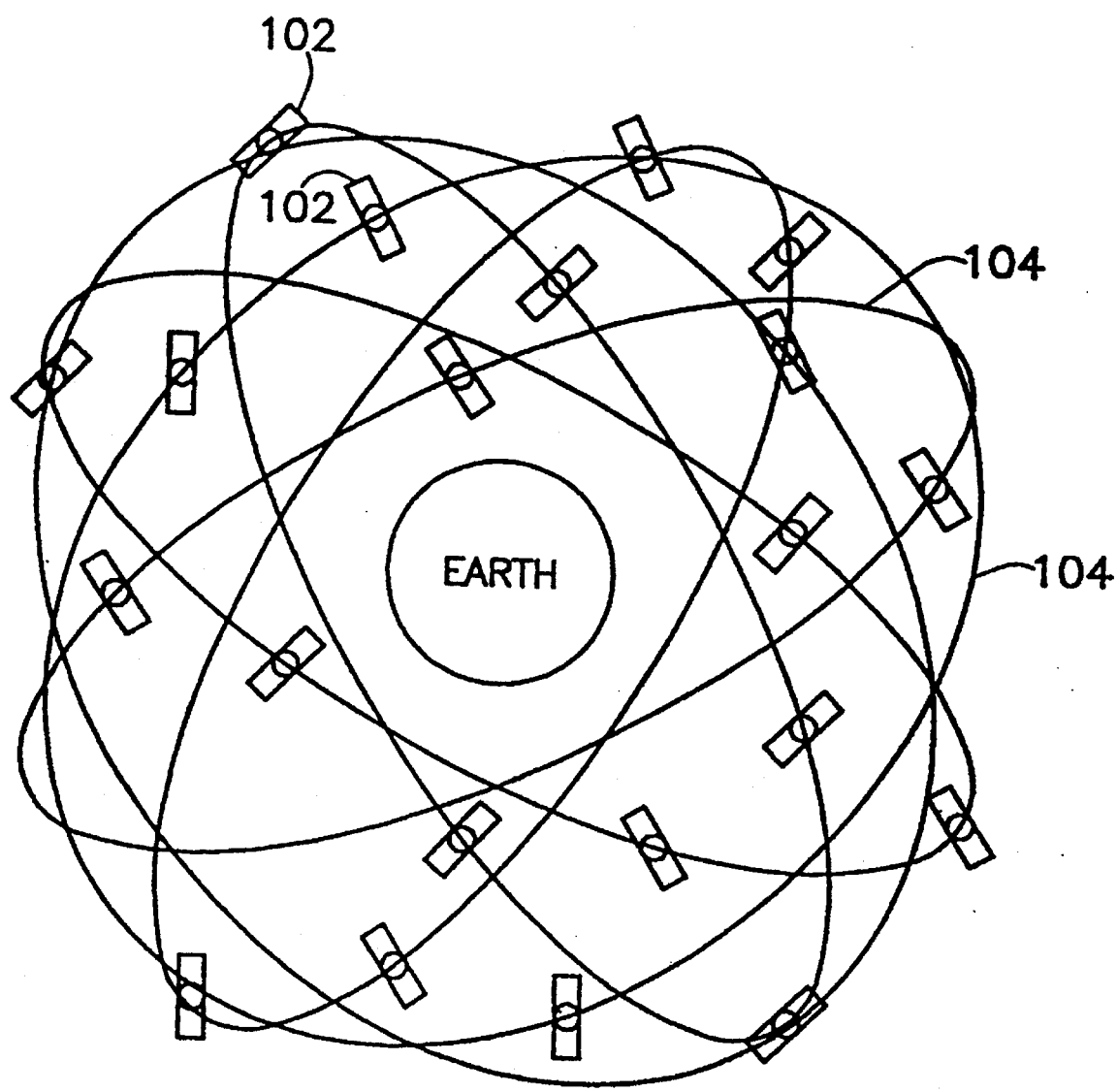
FIG. 1 is a diagram depicting the NAVSTAR GPS satellites in their respective orbits around the Earth.

The invention is a differential system and method for improving the accuracy of vehicle position estimates. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
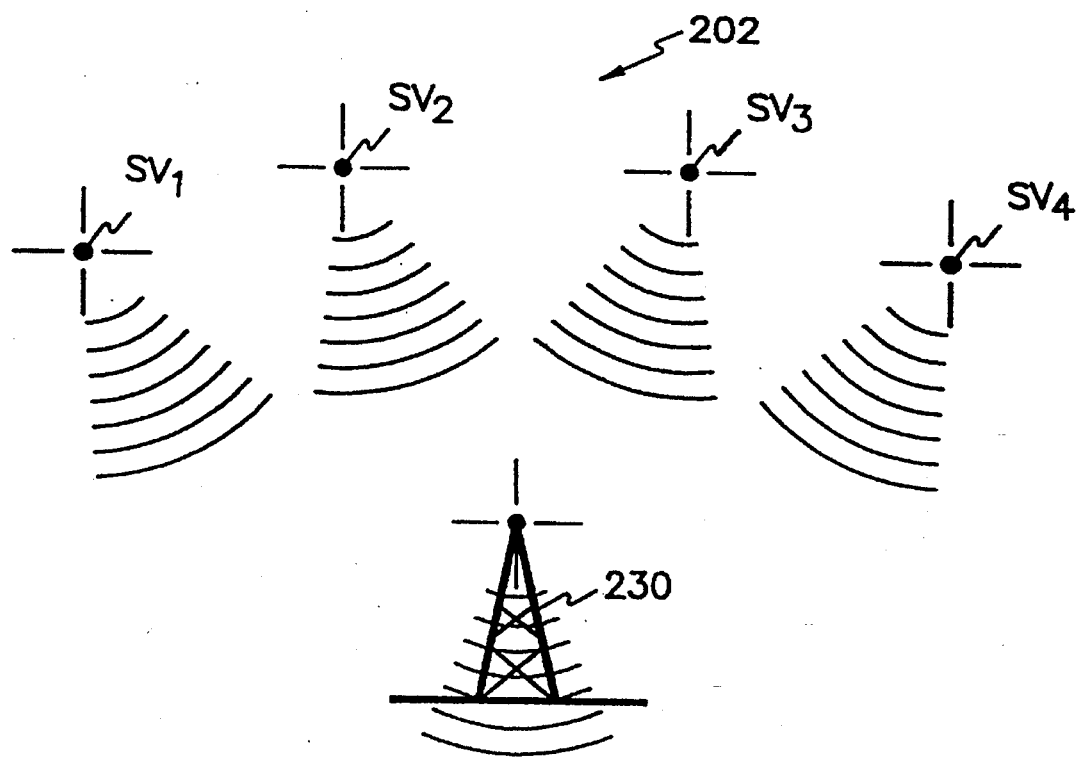
FIG. 2 is a diagram illustrating an autonomous vehicle system which includes a constellation of four GPS satellites, a pseudolite, a base station, and an autonomous vehicle.
Figure 2:
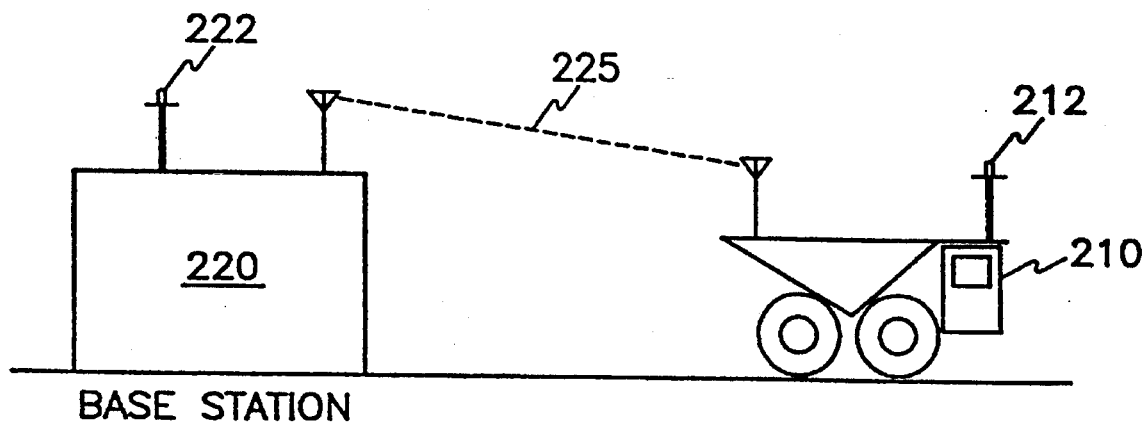

The invention is described in the environment of an autonomous vehicle system 200 as shown in FIG. 2. A representative GPS constellation 202 includes four GPS satellites $SV_1$–$SV_4$ for transmitting GPS data. A vehicle (e.g., an autonomous mining truck) 210 and a base station 220 are adapted to receive the GPS data/navigation signals from each GPS satellite in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver (i.e., a reference receiver) which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 (also referred to as $SV_1$ or space vehicle) will be referenced. It should be understood, however, that where position data from a satellite is required, pseudolite data may be substituted.

Figure 3:
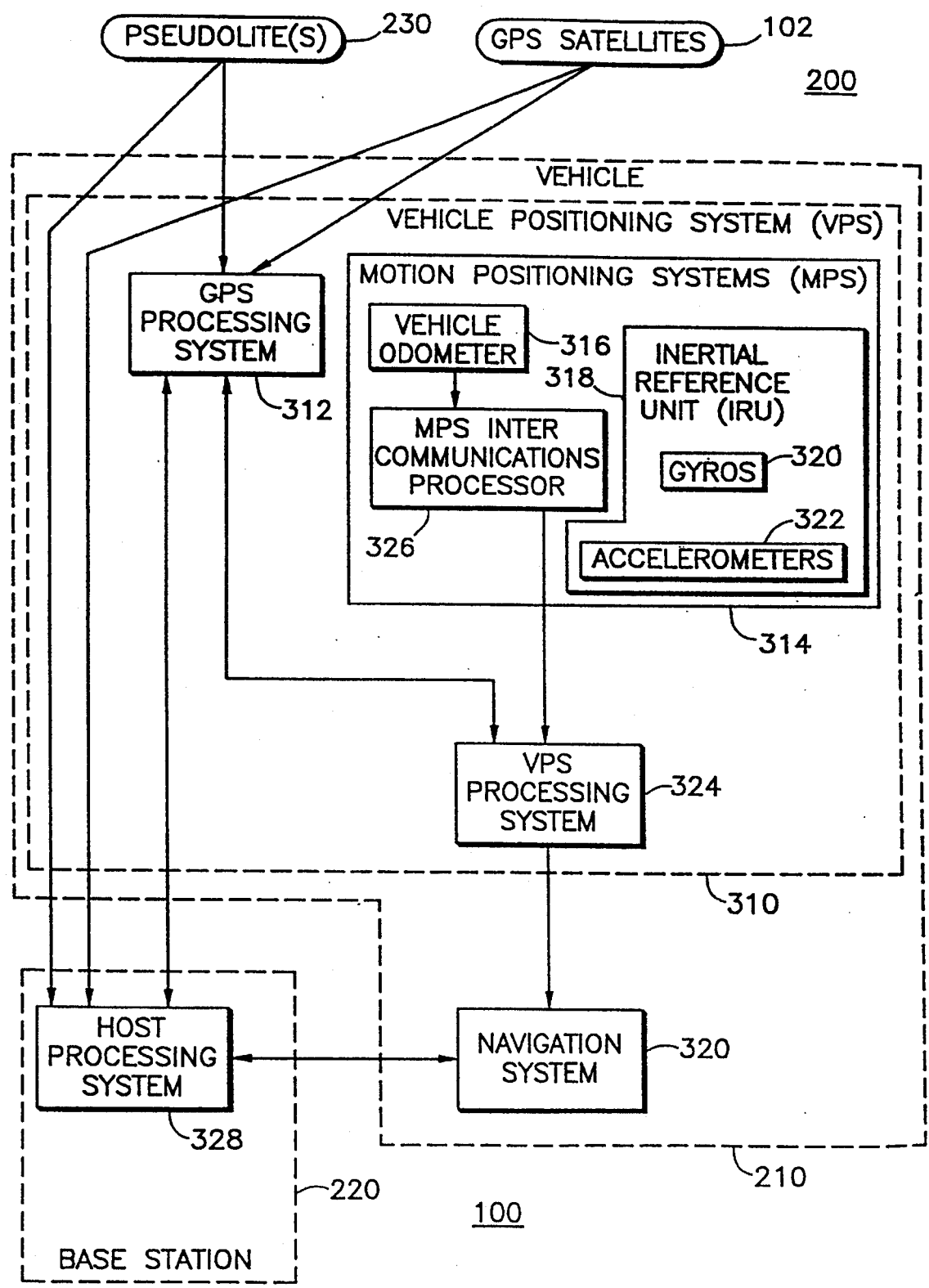
FIG. 3 is a block diagram of the autonomous vehicle system detailing the vehicle positioning system of the autonomous vehicle.

FIG. 3 shows a high-level block diagram of system 200 of the invention, including GPS satellites 102, vehicle 210, base station 220, and pseudolites 230. Vehicle 210 includes a vehicle positioning system (VPS) 310 and a navigation system 320.

VEHICLE POSITIONING SYSTEM (VPS) 310

The task of guiding vehicle 210 along a prescribed path requires, among other things, an accurate estimate of the vehicle's current position relative to some reference point. Once the current position is known, vehicle 310 can be commanded to proceed to its next destination. VPS 310 allows position estimates of vehicle 210 to be determined with extreme precision.

VPS 310 includes a GPS processing system 312, a motion positioning system (MPS) 314 and a VPS processing system 324. GPS processing system 312 receives GPS data, i.e., navigation signals, from GPS satellites 102 and a vehicle velocity from MPS 314 and computes a first position estimate (FPE) for vehicle 210 therefrom. MPS 314 includes a vehicle odometer 316 and an inertial reference unit (IRU) 318 which track the position of the vehicle based on changes from an initial known position. MPS 314 produces (the actual computations are done in VPS processing system 324) a second position estimate (SPE) for vehicle 210.

While the first and second position estimates may be independently derived, the present invention uses data from MPS 314 to improve the precision of the first position estimate. This is described in detail below. The first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by VPS processing system 324 (as discussed below) to produce a more accurate third or best position estimate (BPE).

NAVIGATION SYSTEM 320

Navigation system 320 receives the best position estimate from VPS 314. Navigation system 320 uses this precise, best position estimate to accurately navigate vehicle 210.

GPS PROCESSING SYSTEM 312

Figure 4:
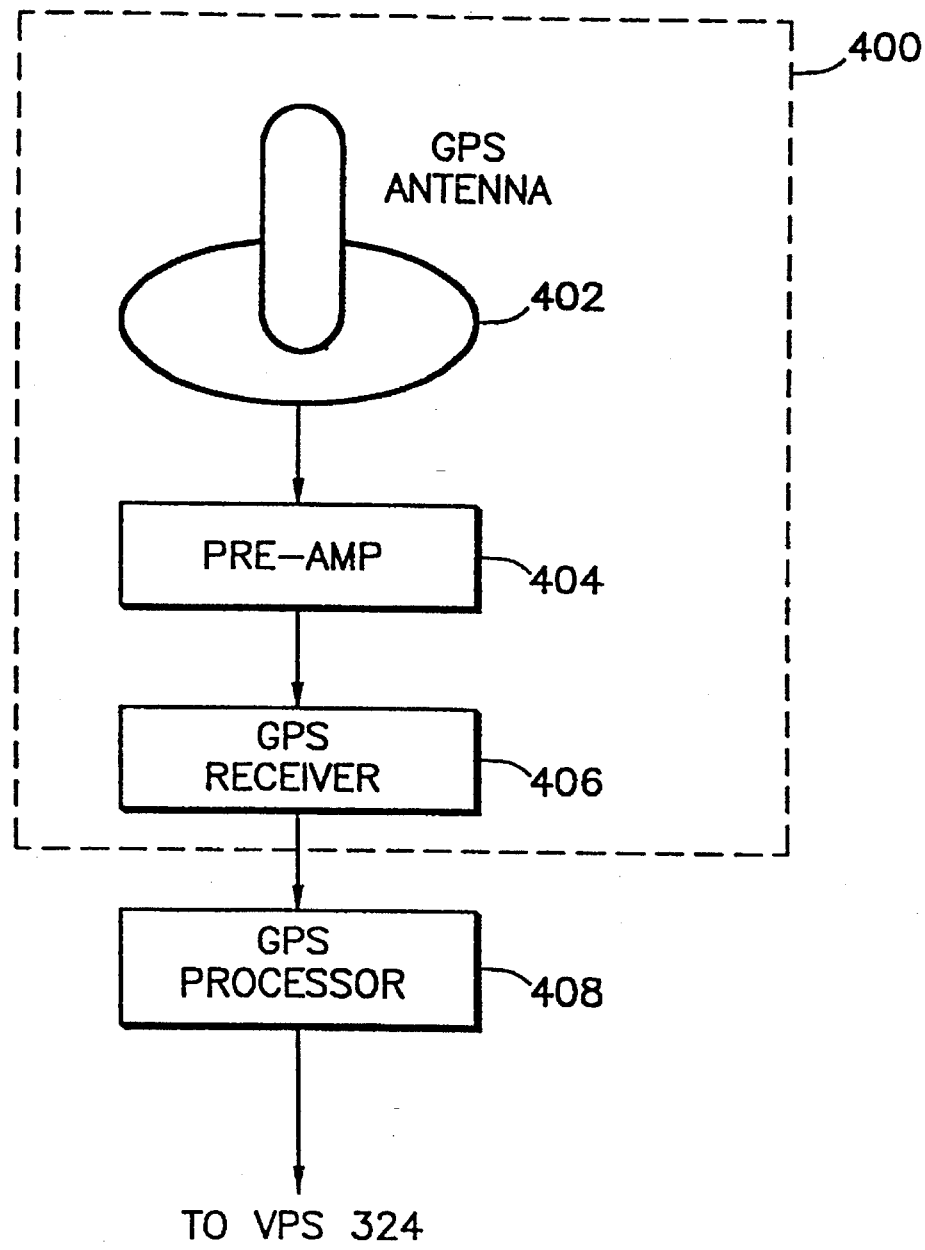
FIG. 4 is a block diagram of a GPS processing system.

GPS processing system 312 is the heart of system 200. With reference to FIG. 4, GPS processing system 312 includes a receiver system 400 and a GPS processor 408. Receiver system 400 receives and decodes the navigation signals from the satellites. GPS processor 408 then uses the information from receiver system 400 to compute the first position estimate.

Receiver system 400 includes a GPS antenna 402, a preamplifier 404, and a GPS receiver 406. Antenna 402 is adapted to receive electromagnetic radiation in the radio portion of the spectrum. Preamplifier 404 amplifies a GPS navigation signal received by GPS antenna 402 from a selected GPS satellite. GPS receiver 406 is a multi-channel receiver which decodes the GPS navigation signals and produces a pseudorange and a satellite position for each selected satellite. GPS processor 408 uses the pseudoranges and satellite positions for a plurality of satellites to calculate the first position estimate for vehicle 210.

In the preferred embodiment, antenna 402 and preamplifier 404 are integrated into a single unit. The combined antenna/preamplifier 402/404 and receiver 406 are available together under part number MX4200 from Magnavox Advanced Products and Systems Co., Torrence, Calif. GPS processor 408 includes an MC68020 microprocessor, available from Motorola, Inc., of Schaumburg, Ill.

Receiver 406 computes a pseudorange for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the distance is called a "pseudorange" because the receiver clock is not precisely synchronized to GPS time (causing a clock error) and because propagation through the different layers of the atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris dam therefrom. The ephemeris data indicates the precise position of the transmitting satellite.

In addition to computing transmission time delays, GPS receiver 406 can compute pseudoranges using accumulated delta range (ADR) or carrier techniques. An ADR is computed by tracking the phase of the carrier wave of the GPS navigation signal. As a satellite and a GPS receiver move away from each other, the increase in distance can be noted as a phase change in the GPS carrier wave. Because the GPS carrier wave is a continuous sinusoid, an ADR is not an absolute range. Rather, an ADR is a relative change in the distance between the satellite and the receiver. Hence, this technique yields a "delta" range.

ADR techniques can be used to compute very accurate pseudoranges. When the term "pseudorange" is used herein, it refers to a pseudorange computed using either ADR techniques or transmission time delay techniques.

KALMAN FILTERING

From a user's perspective, GPS processing system 312 is the most important part of the autonomous vehicle system 200. GPS processing system 312 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 312 relies extensively on Kalman Filtering to eliminate the noise from the GPS navigation signals.

The Kalman filter is a recursive least-squares algorithm which is normally implemented via software or firmware on a digital computer (processor 408). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position $p_1$ and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," *IEEE Transactions on Automatic Control*, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 410 by differentiating the navigation equations and solving for a change in position $(\Delta x_v, \Delta y_v, \Delta z_v)$ from a last known vehicle position $(x_v, y_v, z_v)_{i-1}$ at $t_{i-1}$. This greatly simplifies the solution of the distance equations.

As an alternative to Kalman filtering, least squares estimation or best fit polynomial matching may be used.

MOTION POSITIONING SYSTEM (MPS) 314

As discussed above, MPS 314 includes a vehicle odometer 316 and an inertial reference unit (IRU) 318 which track the position of the vehicle based on changes from an initial known position. The vehicle odometer 316 produces data on the distance travelled by vehicle 210. The IRU 318 comprises laser gyroscope(s) 320 and/or accelerometer(s) 322 which can be used to produce position, velocity, roll, pitch and yaw data. MPS 314 provides the IRU data and the odometer data to VPS processing system 324. An MPS inter-communications processor 326 controls the format of the MPS data which is provided to VPS processing system 324. From this data, VPS processing systems 324 produces a second position estimate for vehicle 210.

VPS PROCESSING SYSTEM 324

As mentioned above, the first position estimate from GPS may be used as an independent indication of the position of vehicle 210. Similarly, the second position estimate computed from MPS data may be used as an independent indication of the position of vehicle 210. In the preferred embodiment, however, the first and second position estimates are combined by VPS processing system 324 to produce a more accurate third or best position estimate. To accomplish this, VPS processing system relies on Kalman filtering and on weighted averaging to optimally combine the data from GPS processing system 312 with the data from MPS 314.

GPS processor 408 calculates the first position estimate using the pseudoranges and satellite positions from GPS receiver 406. This is described below with reference to FIG. 5.

Figure 5:
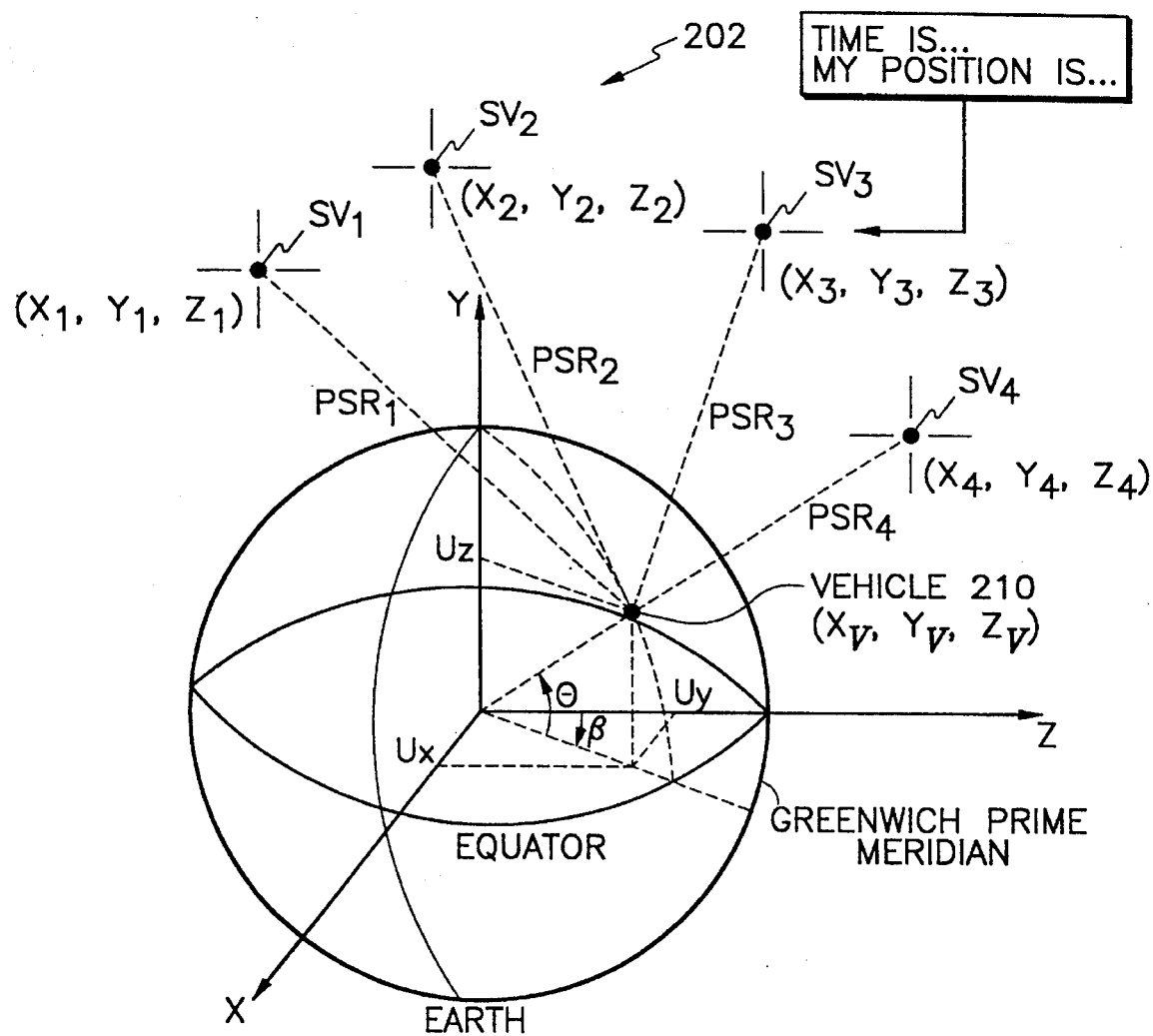
FIG. 5 is a diagram showing the geometric relationship between the center of the Earth, a vehicle near the surface of the Earth and a constellation of GPS satellites.

FIG. 5 shows a sample satellite constellation 202, having GPS satellites $SV_1-SV_4$, in view of vehicle 210. In Cartesian coordinates, with respect to the center of the Earth, satellite $SV_1$ is located at $(x_1,y_1,z_1)$; satellite $SV_2$ is located at $(x_2,y_2,z_2)$; satellite $SV_3$ is located at $(x_3,y_3,z_3)$; satellite $SV_4$ is located at $(x_4,y_4,z_4)$; and vehicle 210 is located at a position $(x_v,y_v,z_v)$.

The Cartesian (x,y,z) coordinates of each satellite are determined by GPS receiver 406 using a satellite's ephemeris dam. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-x_v)^2+(y_1-y_v)^2+(z_1-z_v)^2=(PSR_1-B_{clock})^2$$

$$(x_2-x_v)^2+(y_2-y_v)^2+(z_2-z_v)^2=(PSR_2-B_{clock})^2$$

$$(x_3-x_v)^2+(y_3-y_v)^2+(z_3-z_v)^2=(PSR_3-B_{clock})^2$$

$$(x_4-x_v)^2+(y_4-y_v)^2+(z_4-z_v)^2=(PSR_4-B_{clock})^2$$

where:

$B_{clock}$=clock bias

The "clock bias" is a zero order correction factor which roughly compensates for the clock error discussed above.

Note that there are four unknowns in these equations: $x_v$, $y_v$, $z_v$, and $B_{clock}$. Note also that each satellite produces an equation. Thus, we have four satellites and four unknowns, allowing the equations to be solved for the clock bias ($B_{clock}$) and the position ($x_v,y_v,z_v$) of vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

Note that the accuracy of the first position estimate is highly dependent on the pseudoranges computed by receiver 406. As discussed above, these pseudoranges can be heavily corrupted by atmospheric effects, selective availability, multi-path (reflections), and clock errors. Differential correction using base station 220 will reduce these errors.

BASE STATION 220

GPS data from constellation 202 of GPS satellites 102 is also received by base station 220. Base station 220 comprises a host processing system 328. Host processing system 328 is similar to GPS processing system 312 of vehicle 210 in that it contains a GPS receiver (e.g., a Magnavox model MX4818) for determining the position of the base station with respect to the center the Earth. The base station is used to make a "differential GPS system".

In a differential system, GPS navigation signals received at the base station are used in conjunction with the known position of the base station to compute biases. The base station can compute biases in a variety of ways. In one known method (described in detail below with reference to FIG. 7), a GPS computed pseudorange from each satellite is compared to a computed range (R) between the satellite and the known position of base station 220. Note that, as used herein, the term "range" is a distance computed between two end points. For example, the range (R), between the satellite at a position (x,y,z) and the base station at a position ($x_B,y_B,z_B$) is computed using the standard 3-D (three dimensional) distance equation:

$$(x-x_B)^2+(y-y_B)^2+(z-z_B)^2=R^2$$

The position (x,y,z) of the satellite is determined from the satellite's ephemeris data.

The difference between the GPS computed pseudorange and the computed range is a "differential bias" caused by atmospheric errors, clock errors, selective availability (SA) errors, satellite path shifting, receiver noise, etcetera. The base station computes a bias for each satellite used in the position computations. These biases, when communicated to the vehicle over communication channel 225, can be used to improve the accuracy of the first position estimate.

The differential GPS system assumes that vehicle 210 is located relatively close to base station 220, e.g., within 40 km, such that the atmospheric errors present at base station 220 are approximately the same as the atmospheric errors present at vehicle 210. This allows the vehicle to correct, i.e., improve the accuracy of, the vehicle's first position estimate based on information generated at the base station.

Known differential techniques, such as that described above, are effective for producing relatively accurate position estimates (e.g., to within ten meters). However, greater accuracy is not consistently available from known systems because the differential biases produced contain some residual error. The residual error results, in part, from the assumption that the clock bias at the base station varies linearly or, in other words, the clock bias rate is constant. This assumption results in a smoothing of the base station clock bias. Similarly, the clock bias at the vehicle is also assumed to vary linearly. Thus, the clock bias at the vehicle also introduces error into the position computations.

Known differential techniques are subject to additional error caused by a time lag between calculation of the differential biases and receipt and use of these biases by the vehicle. As this time lag increases, the inaccuracy of the differential biases increases. Furthermore, known differential systems are not able to correct for reflections. Reflections (i.e., multipath signals) result in the calculation of inaccurate pseudoranges.

Finally, known differential systems require that the same satellites be used at both the vehicle and the base station. However, as discussed above, this condition is not always possible due to shading effects.

The invention is a differential GPS system and method capable of computing extremely precise vehicle position estimates. Assuming only that no reflections (multipath errors) are present at the base station, all other errors are substantially eliminated. Clock biases at both the vehicle and the base station are precisely corrected. In addition, errors caused by reflections occurring at the vehicle and base/vehicle lag time problems associated with known differential systems are eliminated. Furthermore, only one common satellite need be available to both the base station and the vehicle.

The invention is based on the premise that there exists a unique vehicle position $P_v$ such that the vector position error between $P_v'$ and $P_v''$ is equivalent to the vector position error between an estimated base station position $P_B'$ and the known position $P_B$ of the base station. (Note that $P_v''$ is expected to converge on $P_v$.) This is expressed mathematically as:

$$\exists P_v \text{ such that } [P_v''-P_v']\equiv[P_B'-P_B[$$

where:

$P_v$ is the actual vehicle position ($x_v,y_v,z_v$)

$P_v'$ is the estimated vehicle position ($x_v',y_v',z_v'$) computed as discussed below, $P_v''$ is the refined estimated vehicle position ($x_v'',y_v'',z_v''$) (computed as discussed below) and is expected to converge on $P_v$ $P_B$ is the actual known position ($x_B,y_B,z_B$) of the base station, and $P_B'$ is the estimated position ($x_B',y_B',z_B'$) of the base station computed as discussed below.

Essentially, the invention computes a position offset resulting from pseudorange and ephemeris errors from a single satellite at both the vehicle and the base station. Then, by subtracting the offset occurring at the base station from the offset occurring at the vehicle, a precise vehicle position offset can be computed. The precise position of the vehicle is computed by adding this offset to the initial vehicle position estimate. This is method is illustrated in the high level flow chart of FIG. 9.

Figure 9:
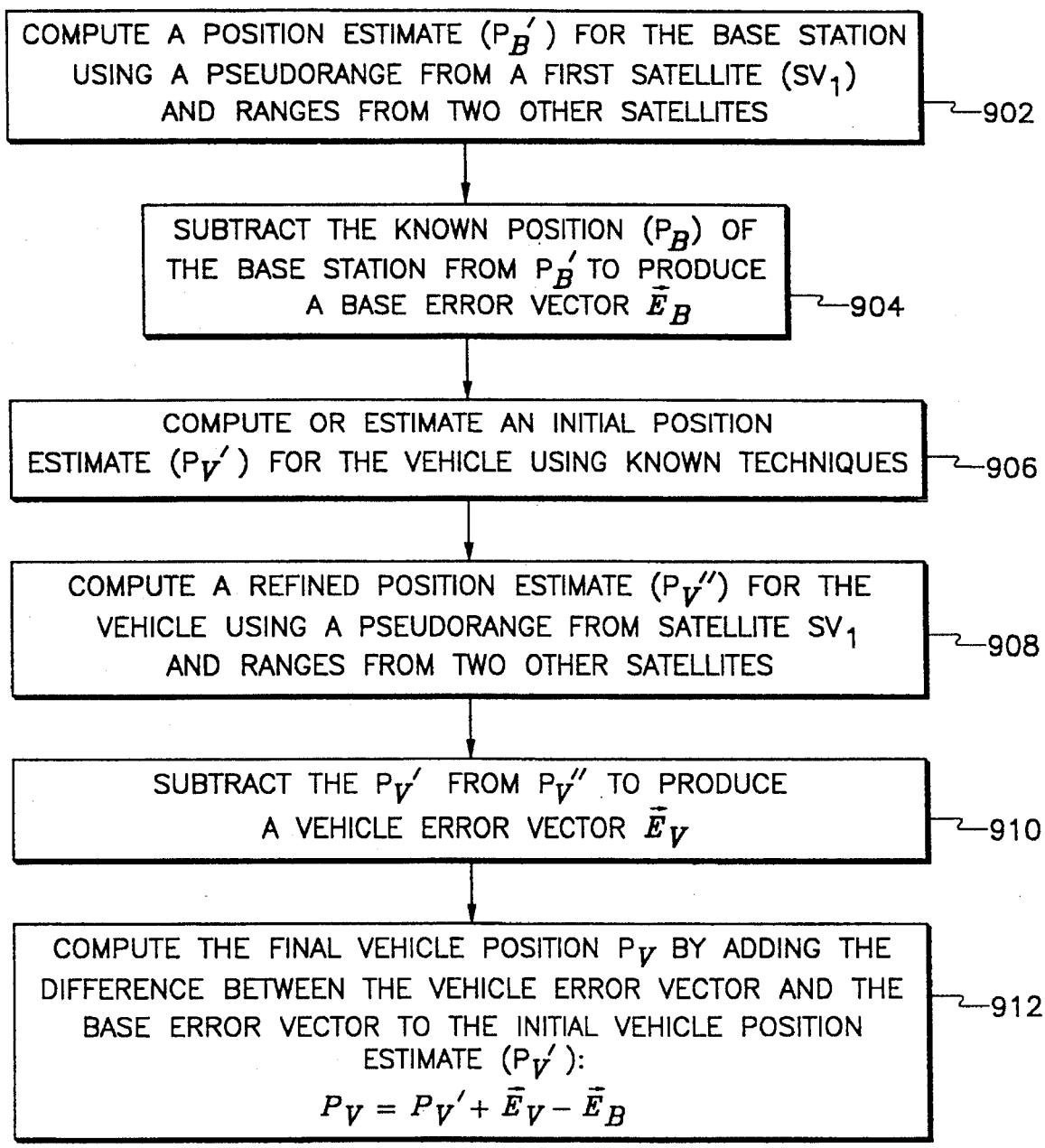
FIG. 9 is a high-level flow chart illustrating the method of the invention for computing a precise position estimate using a differential GPS system.

FIG. 9 shows a method 900 of the invention. In a step 902, a position estimate ($P_B'$) for the base station is computed using a pseudorange from a first satellite ($SV_1$) and ranges from two other satellites. In a step 904, the known position ($P_B$) of the base station is subtracted from the base position estimate $P_B'$ to produce a base error vector $\vec{E}_B$.

An initial position estimate ($P_v'$) for the vehicle is computed or estimated using known techniques (e.g., using known open-ended or differential GPS techniques) at a step 906. At a step 908, a refined position estimate ($P_v''$) for the vehicle is computed using a pseudorange from satellite $SV_1$ and ranges from two other satellites. Note, as discussed in detail below, the base station and the vehicle may use only satellite $SV_1$ as a common satellite. By computing only one pseudorange, the method of the invention substantially limits the error sources to those from a single satellite. These single source errors are then substantially eliminated by the method of the invention. The "two other satellites" need not be used common to both the base and the vehicle. However, also as discussed below, it is preferred that three common satellites are used to achieve precise positioning.

In a step 910, the initial vehicle estimate $P_v'$ is subtracted from the new position estimate $P_v''$ to produce a vehicle error vector $\vec{E}_v$. Finally, in a step 912, the final vehicle position (estimate) $P_v$ is computed by adding the difference between the vehicle error vector and the base error vector to the initial vehicle position estimate ($P_v'$). This is illustrated in the following equation:

$$P_v = P_v' + \vec{E}_v - \vec{E}_B$$

Note that the initial position estimate $P_v'$ is used to compute the refined position estimate $P_v''$ using a pseudorange from only one satellite. Thereafter, $P_v'$ drops out of the equation since $\vec{E}_v$ is equal to $P_v'' - P_v'$. The resulting equation is:

$$P_v = P_v'' - \vec{E}_B$$

Figure 6A:
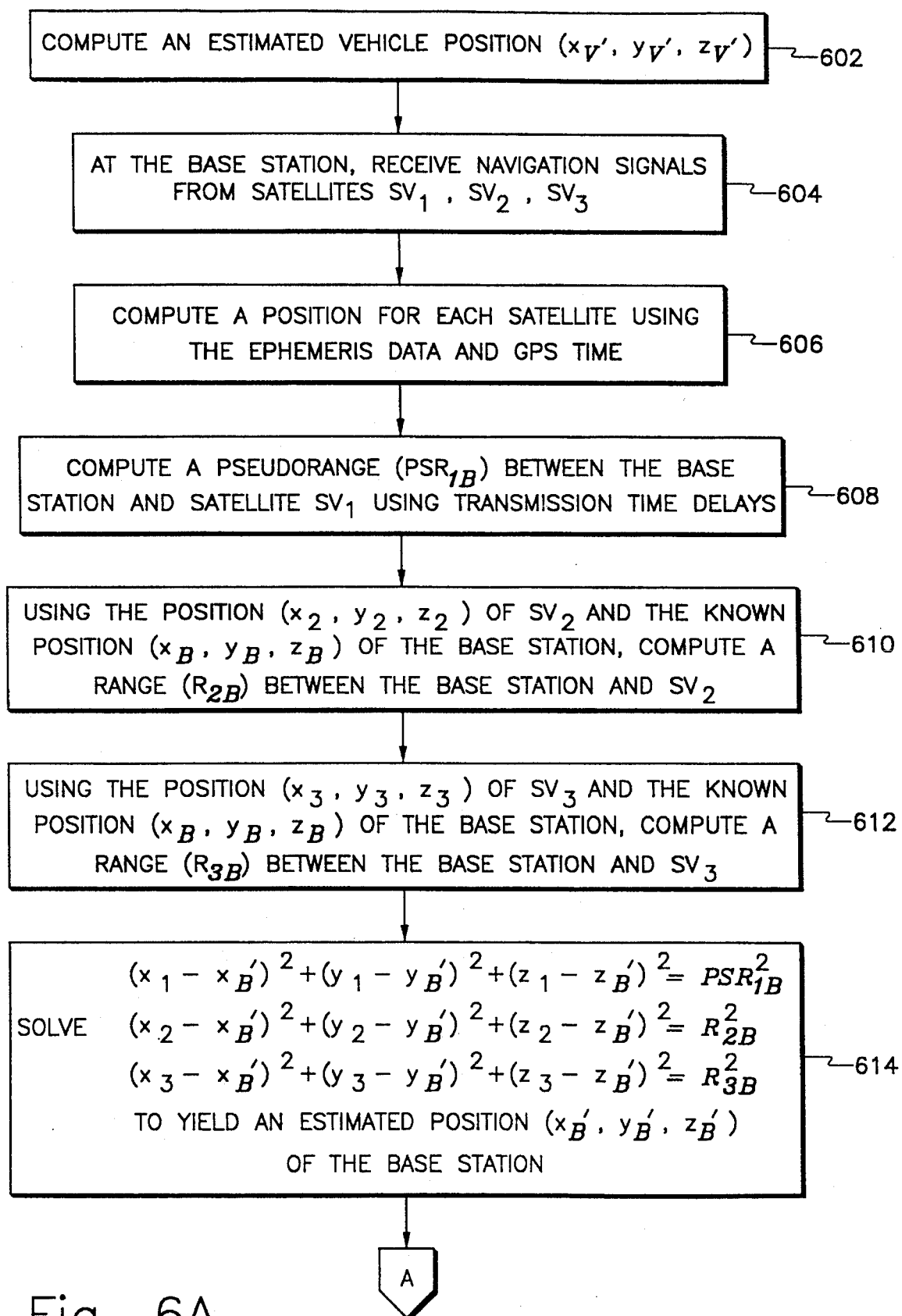
FIGS. 6A, 6B and 6C provide a detailed flow chart illustrating the method according to the invention for computing a precise position estimate using a differential GPS system.
Figure 6B:
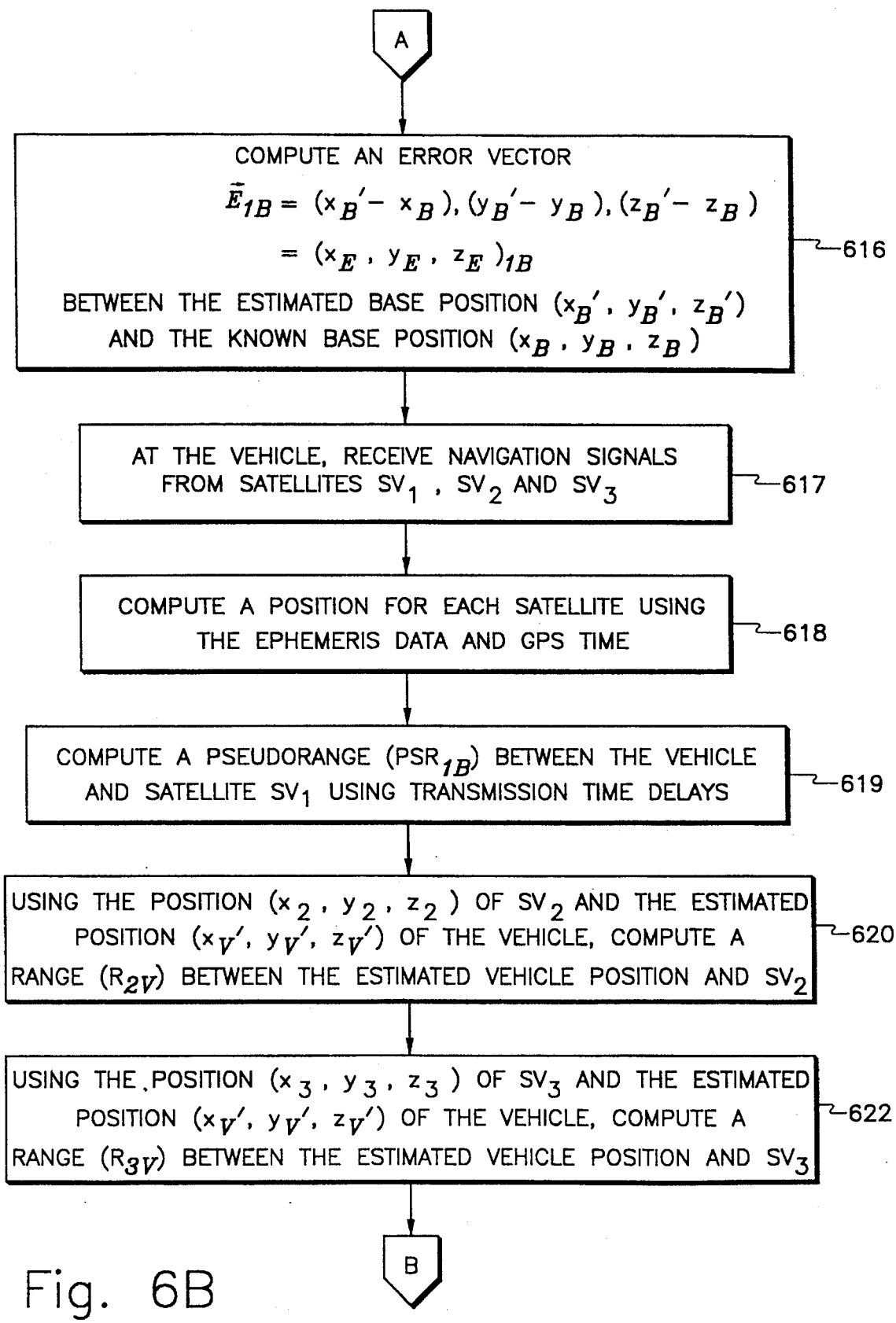
Figure 6C:
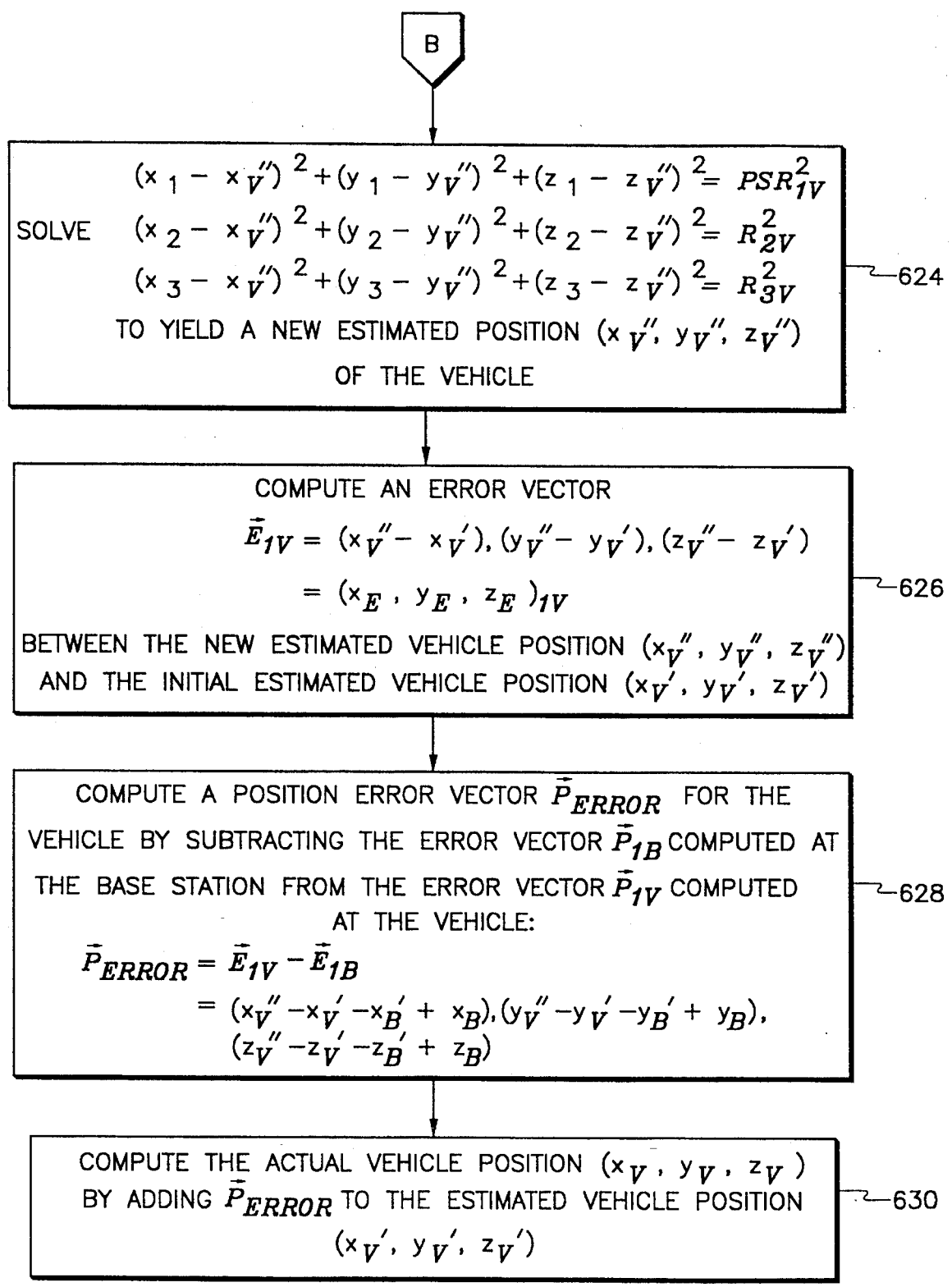

Operation of a sample embodiment 600 of the differential method of the invention is now described with reference to FIGS. 6A, 6B and 7. In a step 602, an estimated vehicle position ($P_v' = x_v', y_v', z_v'$) is computed. In the preferred embodiment of the invention, $P_v'$ is computed according to the differential method 700 illustrated in FIG. 7 and discussed below. However, this is not required. In fact, $P_v'$ may be an arbitrarily determined. Such an arbitrary estimate will, however, reduce accuracy since it may lessen the accuracy of the assumption made below that angle α is very near zero (see FIG. 8).

In a step 604, navigation signals are received at the base station from three satellites $SV_1$, $SV_2$ and $SV_3$. At step 606, a satellite position ($x_i, y_i, z_i$) is computed for each satellite using the ephemeris data and GPS time. In a step 608, a pseudorange ($PSR_{1B}$) between the base station and satellite $SV_1$ is computed as discussed above. In a step 610, a range ($R_{2B}$) between the known position ($x_B, y_B, z_B$) of the base station and the position ($x_2, y_2, z_2$) of $SV_2$ is computed using the 3-D distance equation. In a step 612, a range ($R_{3B}$) between the known position ($x_B, y_B, z_B$) of the base station and the position ($x_3, y_3, z_3$) of $SV_3$ is computed using the 3-D distance equation.

The pseudorange $PSR_{1B}$ and the two ranges $R_{2B}$ and $R_{3B}$ are used to compute an estimated position ($x_B', y_B', z_B'$) of the base station in a step 614. This is done by solving the following equations:

$$(x_1 - x_B')^2 + (y_1 - y_B')^2 + (z_1 - z_B')^2 = PSR_{1B}^2$$

$$(x_2 - x_B')^2 + (y_2 - y_B')^2 + (z_2 - z_B')^2 = R_{2B}^2$$

$$(x_3 - x_B')^2 + (y_3 - y_B')^2 + (z_3 - z_B')^2 = R_{3B}^2$$

In a step 616, the estimated base position ($P_B'$) is compared to the actual base position ($P_B$) to produce a base error vector representing the vector difference between the two positions:

$$\vec{E}_{1B} = (x_B' - x_B), (y_B' - y_B), (z_B' - z_B)$$
$$= (x_E, y_E, z_E)_{1B}$$

The method then proceeds to step 617. Note that steps 617–626 performed at the vehicle are similar to corresponding steps 604–616 performed at the base station. In a step 617, navigation signals are received at the vehicle from three satellites $SV_1$, $SV_2$ and $SV_3$. At step 618, a satellite position ($x_i, y_i, z_i$) is computed for each satellite using the ephemeris data and GPS time. In step 619, a pseudorange ($PSR_{1v}$) between the vehicle and satellite $SV_1$ is computed as discussed above. In a step 620, a range ($R_{2v}$) between the estimated position ($x_v', y_v', z_v'$) of the vehicle and the position ($x_2, y_2, z_2$) of $SV_2$ is computed using the 3-D distance equation. In a step 622, a range ($R_{3v}$) between the estimated position ($x_v', y_v', z_v'$) of the vehicle and the position ($x_3, y_3, z_3$) of $SV_3$ is computed using the 3-D distance equation.

The pseudorange $PSR_{1v}$ and the two ranges $R_{2v}$ and $R_{3v}$ are used to compute a new or refined estimated position ($x_v'', y_v'', z_v''$) of the vehicle in a step 624. This is done by solving the following equations:

$$(x_1 - x_v'')^2 + (y_1 - y_v'')^2 + (z_1 - z_v'')^2 = PSR_{1v}^2$$

$$(x_2 - x_v'')^2 + (y_2 - y_v'')^2 + (z_2 - z_v'')^2 = R_{2v}^2$$

$$(x_3 - x_v'')^2 + (y_3 - y_v'')^2 + (z_3 - z_v'')^2 = R_{3v}^2$$

In a step 626, the refined estimated vehicle position ($P_v''$) is compared to the initial estimated vehicle position ($P_v'$) to produce a vehicle error vector $$\vec{E}_{1V} = (x_v'' - x_v'), (y_v'' - y_v'), (z_v'' - z_v')$$
$$= (x_E, y_E, z_E)_{1V}$$

representing the vector difference between the two positions.

Next, the base error vector ($\vec{E}_{1B}$) and the vehicle error vector ($\vec{E}_{1V}$) are compared, in a step 628, to produce a vehicle position error vector $\vec{P}_{ERROR}$, where:

$$\vec{P}_{ERROR} = \vec{E}_{1V} - \vec{E}_{1B}$$
$$= (x_v'' - x_v' - x_B' + x_B), (y_v'' - y_v' - y_B' + y_B),$$
$$(z_v'' - z_v' - z_B' + z_B)$$

Finally, in a step 630, the actual vehicle position ($x_v, y_v, z_v$) is computed by adding $\vec{P}_{ERROR}$ to the initial estimated vehicle position ($x_v', y_v', z_v'$). This results in a precisely computed vehicle position which can be used as the first position estimate in vehicle positioning system 310. Alternatively and importantly, since the accuracy of the first position estimate computed in accordance with this method will be highly accurate, it may be used as the best position estimate for navigating vehicle 210 without input from motion positioning system 314.

Figure 7A:
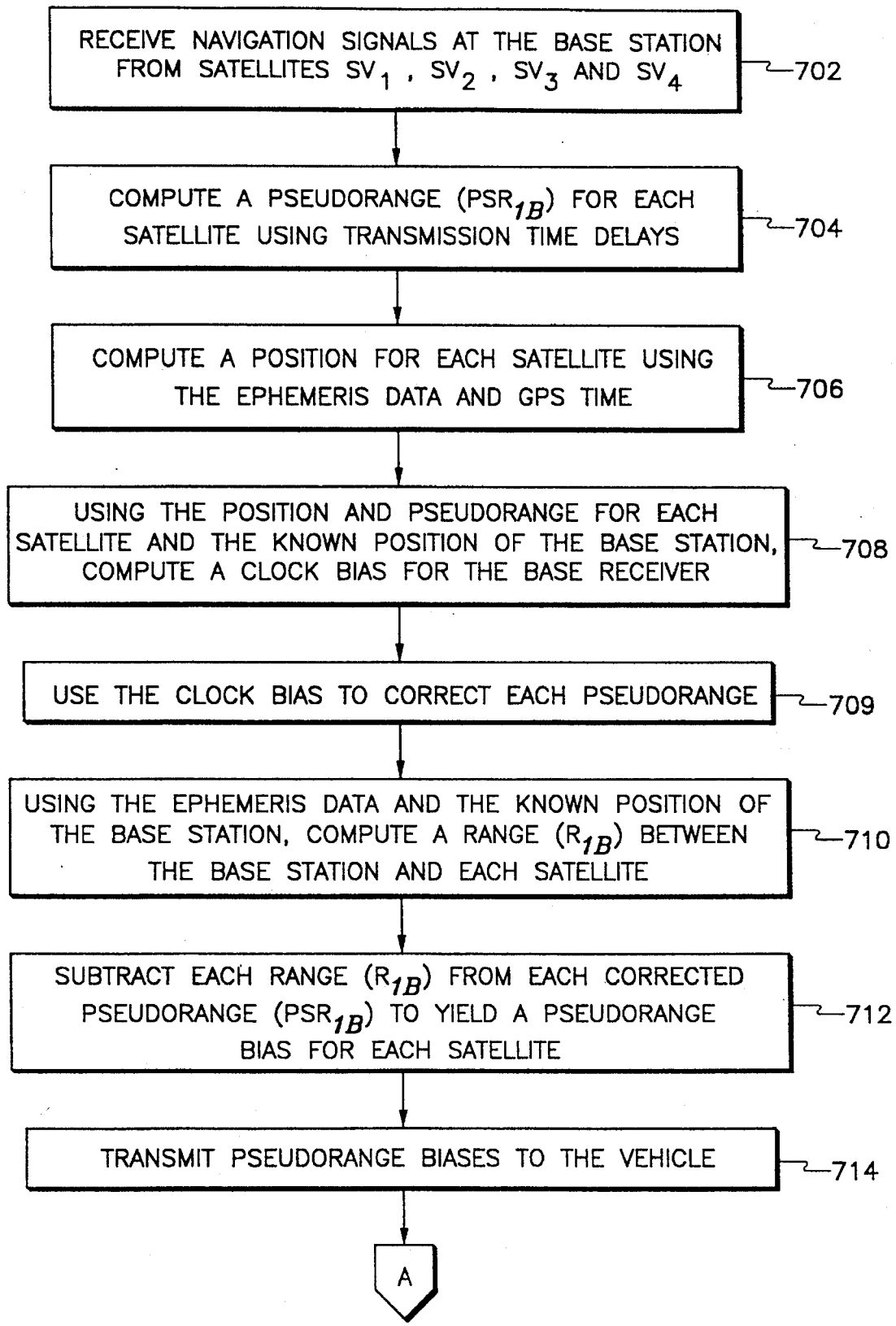
FIG. 7 is a flow chart illustrating a sample method for computing an estimated vehicle position using a differential GPS technique.
Figure 7B:
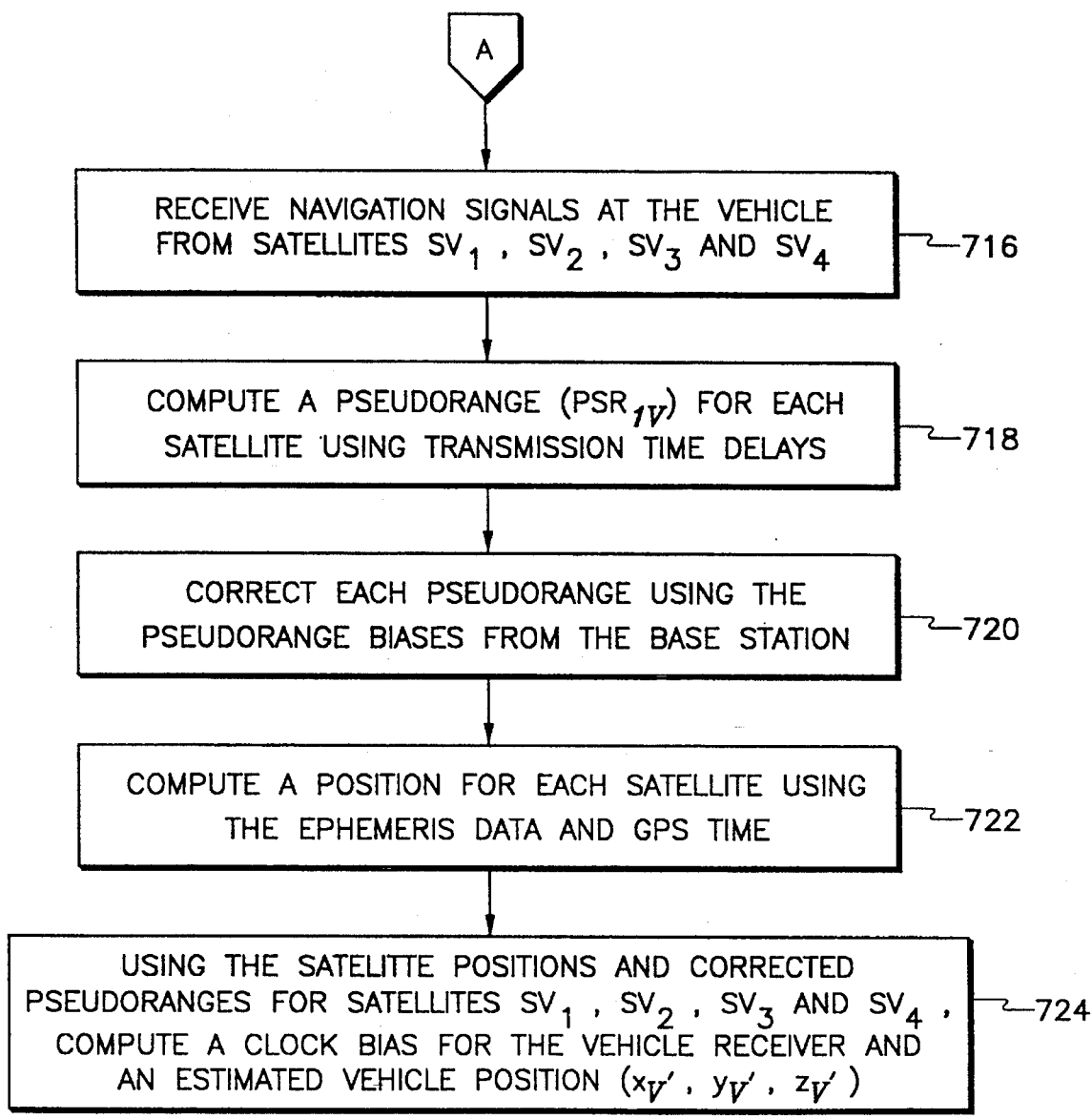

As discussed above, $P_v'$ of step 602 is computed according to the differential method 700 illustrated in FIG. 7 in the preferred embodiment of the invention. FIG. 7 is an example of a common differential GPS processing technique. Operation of differential method 700 is described below.

In a step 702, navigation signals are received at the base station from satellites $SV_1$, $SV_2$, $SV_3$ and $SV_4$. A pseudorange ($PSR_i$) is computed for each satellite, in a step 704. A position for each satellite is computed, in a step 706, using the ephemeris data and GPS time. Using the position and pseudorange for each satellite and the known position of the base station, in a step 708, a clock bias is computed for the base receiver.

In a step 709, the clock bias is used to correct each pseudorange for errors induced by base station clock differentials. Next, in a step 710, the satellite positions and the known position of the base station are used to compute a range ($R_{iB}$) between the base station and each satellite.

In a step 712, each range ($R_{iB}$) is subtracted from each corrected pseudorange ($PSR_{iB}$) to yield a pseudorange bias for each satellite. These biases are transmitted to the vehicle in a step 714 for use in improving the accuracy of the vehicle position estimate.

In a step 716, navigation signals are received at the vehicle from satellites $SV_1$, $SV_2$, $SV_3$ and $SV_4$. A pseudorange ($PSR_{i_v}$) for each satellite is computed in a step 718. In a step 720, the vehicle pseudoranges are corrected using the pseudorange biases received from the base station in step 714. Next, in a step 722, a position for each satellite is computed using the ephemeris data and GPS time. Finally, a clock bias and an estimated vehicle position ($x_v'$, $y_v'$, $z_v'$) are computed in a step 724 using the satellite positions and corrected pseudoranges for satellites $SV_1$, $SV_2$, $SV_3$ and $SV_4$.

Note that in the preferred embodiment of the invention, vehicle error vector $\vec{E}_{V1}$ includes:

(1) ephemeris errors for satellites $SV_1$, $SV_2$, $SV_3$ (introduced at steps 620–624);

(2) vehicle clock bias (introduced primarily at step 619);

(3) base station clock bias (introduced primarily at step 720);

(4) multipath errors (reflections) at the vehicle due to satellite $SV_1$ (introduced primarily at step 619); and (5) atmospheric errors in the pseudorange of satellite $SV_1$ (introduced primarily at step 619).

Base station error Vector $\vec{E}_{B1}$ includes:

(1) ephemeris errors for satellites $SV_1$, $SV_2$, $SV_3$ (introduced at steps 610–614);

(2) base station clock bias (introduced primarily at step 608); and (3) atmospheric errors in the pseudorange of satellite $SV_1$ (introduced primarily at step 608).

Thus, when base station error Vector $\vec{E}_{B1}$ is subtracted from vehicle error vector $\vec{E}_{V1}$ (this difference is the position error vector $\vec{P}_{ERROR}$) at step 628, all errors are substantially negated except for multipath errors (reflections) at the vehicle due to satellite $SV_1$ and vehicle clock bias. This is a vast improvement over conventional differential techniques because errors which result from non-linearities in the base clock bias are eliminated. The invention however is capable of further error correction.

If the initial estimated vehicle position of step 602 is computed using a differential technique, such as that illustrated in FIG. 7, the multipath errors (reflections) at the vehicle due to satellite $SV_1$ and the vehicle clock bias errors can also be eliminated. This occurs at step 630 when the estimated vehicle position ($P_v'=x_v'$,$y_v'$,$z_v'$) is added to the position error vector $\vec{P}_{ERROR}$.

Essentially, what occurs in step 630 is as follows. When the initial position estimate is computed according to method 700 or a similar method, $P_v'$ will be negatively influenced by the clock bias of the vehicle receiver (GPS receiver 406) and by any reflections occurring at the vehicle. Thus, when the estimated vehicle position ($P_v'$) is added to the position error vector $\vec{P}_{ERROR}$, the clock bias errors and any multipath errors will be substantially eliminated.

Differential GPS techniques, such as that illustrated in FIG. 7, may be able to produce a vehicle position estimate which is accurate to within approximately ten meters. The inventor contemplates that the method 900 of the invention will be able to produce vehicle position estimates with centimeter accuracy.

Note that the method of the invention does not require that the same satellites be used at both the base station and the vehicle. The only requirement is that at least one satellite (e.g., satellite $SV_1$) be used at both the base station and the vehicle. Note, however, that if only one common satellite is used, the accuracy of the system will be reduced because ephemeris errors from non-common satellites will not be eliminated from the position computations. Nevertheless, most ephemeris errors will be eliminated in step 602 using the method of FIG. 7. Thus, even if only one common satellite is available, the inventor contemplates that the system and method of the invention will achieve an accuracy at least as good as conventional systems but without the conventional requirement of at least four common satellites.

The invention is based on the following assumption. Known differential GPS techniques are able to compute relatively accurate vehicle position estimates (e.g., accurate to within ten meters). If an estimated vehicle position $P_v'$ is relatively close to the actual vehicle position $P_v$, then it can be assumed that the magnitude of an error in a pseudorange received from a satellite $SV_1$ is equal to the distance d between the actual vehicle position $P_v$ and the estimated vehicle position $P_v'$. This is illustrated in FIG. 8.

Figure 8:
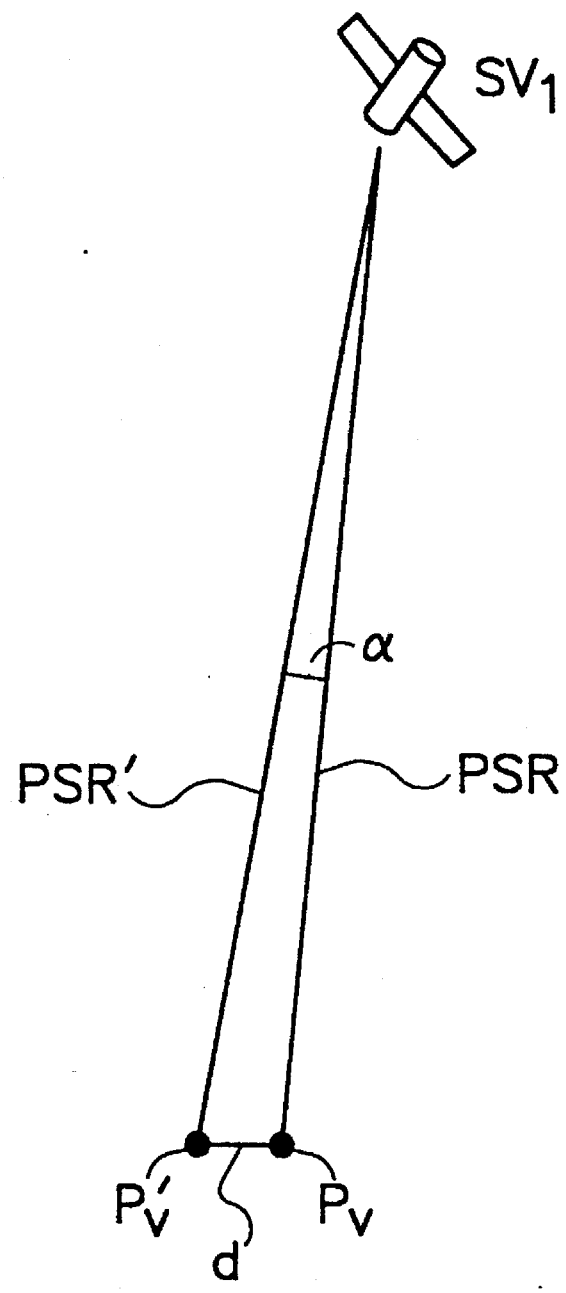
FIG. 8 is a diagram illustrating the geometric relationship between a satellite and an Earth-based receiver.

FIG. 8 depicts a satellite $SV_1$ having a measured pseudorange PSR' to an estimated vehicle position $P_v'$ and an actual pseudorange PSR to an actual vehicle position $P_v$. Angle $\alpha$ is the angle formed between the two pseudorange vectors. By the Law of Cosines:

$$d^2 = PSR'^2 + PSR^2 - 2(PSR')(PSR)\cos \alpha$$

From inspection of this equation it can be noted that, if the pseudoranges are much greater than d (i.e., PSR>>d), then it can be assumed that angle approaches zero. This is a valid assumption since pseudoranges are in the order of 20,000 kilometers while distance d is in the order of one to ten meters. In that case, the equation will simplify to d=|PSR'−PSR|.

The differential technique of the invention has many applications. For example, the method may be performed using a pseudorange from a first satellite and then performed again using a pseudorange from a second satellite. The two position estimates may then be averaged for a further increase in accuracy. As another example, the method may be repeated for several satellites and then the position error vectors $$\vec{P}_{ERROR}(i), \vec{P}_{ERROR}(i+1), \ldots$$

for the satellites can be compared. The satellites with the smallest position error vectors can then be used in the vehicle position computations to produce precise position estimates.

While the invention has been particularly shown and described with reference to several preferred embodiments thereof, it will be understood by those skilled in the art that various changes in form and details may be made therein without departing from the spirit and scope of the invention as defined in the appended claims.

I claim:

1. A method for computing the position of a mobile receiver at or near the surface of the Earth using a base receiver having a known position and using a satellite-based navigation system including a constellation of navigation satellites, the method comprising the steps of:

(a) receiving at the base receiver and at the mobile receiver, a navigation signal from a first navigation satellite;

(b) receiving at the base receiver and at the mobile receiver, navigation signals from at least two other navigation satellite;

(c) computing for the base receiver, a first pseudorange based on said navigation signal received from said first navigation satellite, and first and second ranges based on said navigation signals received from said at least two other navigation satellites;

(d) computing a base position estimate for the base receiver using said first pseudorange and said first and second range;

(e) computing a first vector difference between the base position estimate and the known position of the base receiver;

(f) computing an initial position estimate for the mobile receiver;

(g) computing for the mobile receiver, a second pseudorange based on said navigation signal received from said first navigation satellite, and third and fourth ranges based on the navigation signals received from at least two other navigation satellites;

(h) computing a refined position estimate for the mobile receiver using said second pseudorange and said third and fourth ranges;

(i) computing a second vector difference between the initial position estimate and the refined position estimate of the mobile receiver;

(j) computing a third vector difference between said first vector difference and said second vector difference; and (k) adding said third vector difference to said initial position estimate for the mobile receiver to produce a final position estimate for the mobile receiver.

2. The method of claim 1, wherein said initial position estimate is computed using a triangulation technique and pseudoranges and satellite positions from at least four satellites.

3. The method of claim 1, wherein said initial position estimate is computed using a differential technique.

4. The method of claim 3, wherein said at least two other satellites of step (c) are the same as said at least two other satellites of step (g).

5. A method for computing the position of a first receiver at or near the surface of the Earth using a second receiver having a known position and using a satellite-based navigation system including a constellation of navigation satellites, the method comprising the steps of:

(a) receiving, from a first plurality of navigation satellites, a first plurality of navigation signals at the first receiver;

(b) computing, from said first plurality of navigation signals, a position estimate for the first receiver;

(c) receiving, from the plurality of navigation satellites, a second plurality of navigation signals at the second receiver, said first and second pluralities of satellites including a first satellite common to both;

(d) computing, from each navigation signal, a satellite position;

(e) computing, from the navigation signal from said first satellite, a first pseudorange between said second receiver and said first satellite;

(f) computing, from the position of a second satellite and the known position of the second receiver, a first range between said second satellite and the second receiver;

(g) computing, from the position of a third satellite and the known position of the second receiver, a second range between said third satellite and the second receiver;

(h) computing, from said first pseudorange, said first range, said second range and said positions for said first, second and third satellites, an estimated position of said second receiver;

(i) computing a difference between said estimated and said known positions of said second receiver to determine a first error vector;

(j) computing, from said first plurality of navigation signals, a position estimate for the first receiver;

(k) computing, from the navigation signal from said first satellite, a second pseudorange between said first receiver and said first satellite;

(l) computing, from the position of a second satellite and said estimated position of the first receiver, a third range between said second satellite and the first receiver;

(m) computing, from the position of a third satellite and said estimated position of the first receiver, a fourth range between said third satellite and the first receiver;

(n) computing, from said second pseudorange, said third range, said fourth range and said positions for said first, second and third satellites, a refined estimated position of said first receiver;

(o) computing a difference between said refined estimated position and said estimated position of said first receiver to determine a second error vector;

(p) computing a difference between said first and second error vectors to determine a third error vector for the first receiver; and (q) using said third error vector to correct the estimated position of the first receiver.

6. The method of claim 5, wherein said position estimate of step (j) is computed using a differential technique.

7. An apparatus for computing the position of a mobile receiver at or near the surface of the Earth using a base receiver having a known position and using a satellite-based navigation system including a constellation of navigation satellites, the apparatus comprising:

(a) means for receiving at the base receiver and at the mobile receiver, a navigation signal from a first navigation satellite;

(b) means for receiving at the base receiver and at the mobile receiver, navigation signals from at least two other navigation satellites;

(c) means for computing for the base receiver, a first pseudorange based on said navigation signal from said first navigation satellite, and first and second ranges based on said navigation signals received from said at least two other navigation satellites;

(d) means, coupled to said base receiver, for computing a base position estimate for the base receiver using said first pseudorange and said first and second ranges and for computing a first vector difference between the base position estimate and the known position of the base receiver;

(e) means for computing an initial position estimate for the mobile receiver;

(f) means for computing for the mobile receiver, a second pseudorange based on said navigation signal received from said first navigation satellite, and third and fourth ranges based on the navigation signals received from at least two other navigation satellites;

(g) means, coupled to the mobile receiver, for computing a refined position estimate for the mobile receiver using said second pseudorange and said third and fourth ranges and for computing a second vector difference between the initial position estimate and the refined position estimate of the mobile receiver; and (h) means for computing a third vector difference between said first vector difference and said second vector difference and for adding said third vector difference to said initial position estimate for the mobile receiver to produce a final position estimate for the mobile receiver.

* * * * *